July 2, 1940.    G. V. ANDERSON    2,206,524
INCREASING THE RANGE OF HYDRAULIC FLOW
Filed Oct. 19, 1936    2 Sheets-Sheet 1
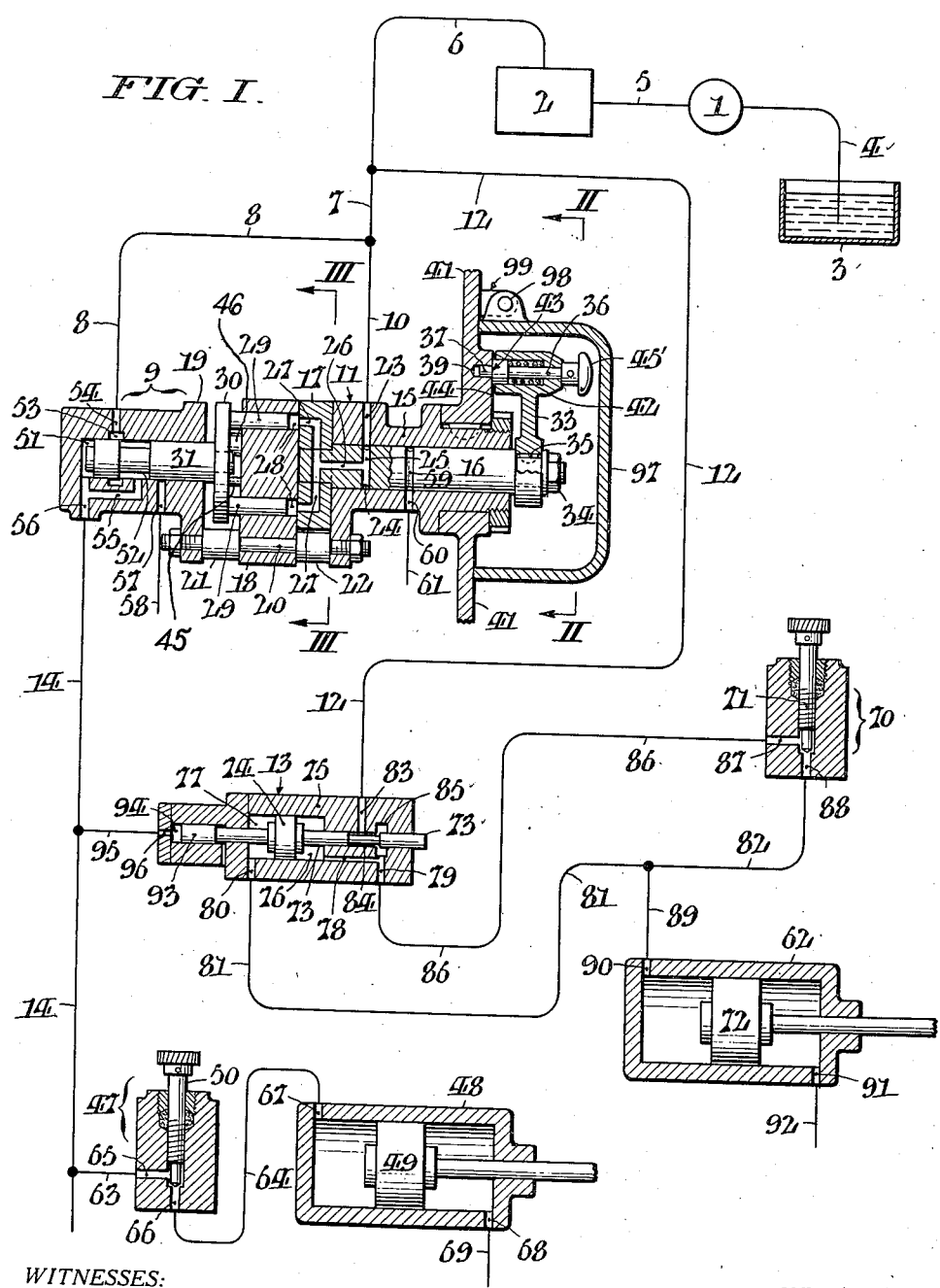
WITNESSES:
John A. Weidler
William Bell, Jr.
INVENTOR:
Gilbert V. Anderson,
BY Fraley & Paul
ATTORNEYS.

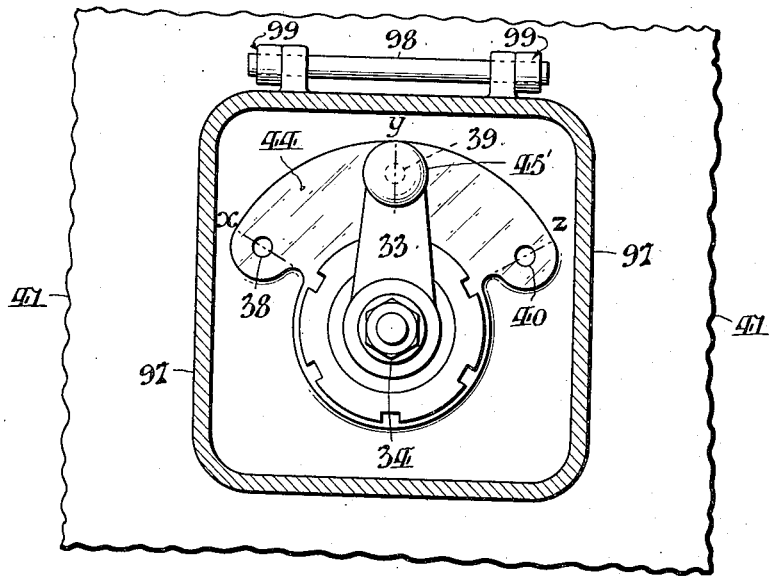
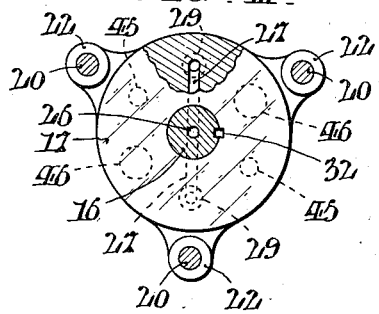
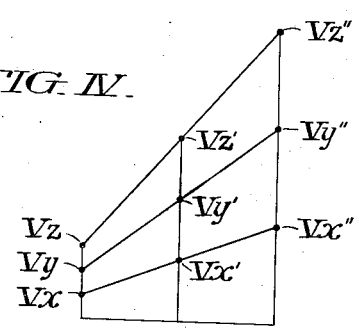

Patented July 2, 1940

2,206,524

UNITED STATES PATENT OFFICE 2,206,524

INCREASING THE RANGE OF HYDRAULIC FLOW

Gilbert V. Anderson, Philadelphia, Pa.

Application October 19, 1936, Serial No. 106,387

1 Claim. (Cl. 60—52)

This invention relates to hydraulic flow and, although it may be used in other applications, it finds its greatest usefulness in the field of machine tools.

This invention is adapted to be used in hydraulically operated machines embodying what is known as the "open circuit," i. e., those which receive working liquid from a source of constant pressure and discharge into an open sump or reservoir, from which the liquid is again drawn back to the pressure source. Control of the rates of flow in hydraulically operated machines embodying the open circuit type of operation is commonly effected by means of some form of metering or throttling valve and, because of the fine particles of scale, grit, lint or other foreign matter that will invariably find their way into a hydraulic system, in spite of any strainers or other precautions taken to prevent such occurrence, the extent to which the rate of flow can be reduced with a given pressure differential at the valve is limited by the ever present possibility of "clogging" at the reduced valve opening. If the pressure differential is reduced to give a minimum flow rate with a given minimum valve opening the maximum feed rate for a given maximum opening of the valve is also reduced. Thus it may be seen that with a fixed pressure differential at the flow control valves, the range of flow rates obtainable is limited and is ordinarily not sufficient to cover all classes of work that a machine tool so operated may be called upon to handle.

The primary object of this invention is to provide a means for increasing the range of flow rates produced by the flow control valves of a hydraulically operated machine which operates on the open circuit principle.

Other objects and ancillary advantages of the invention will be set forth or pointed out in the detailed description thereof which follows, or will be apparent from such description.

The manner in which the stated objects are accomplished embraces simultaneously varying the pressure differential at the feed-control valves for all the hydraulically operated movable members of such a hydraulically actuated machine, or machines; and by the concurrent variation of the pressure differential of the various feed control valves being effected by varying what may be termed the "control pressure" to which the pressure differential of all the flow control valves is either equal or proportional.

In order that this invention may be clearly understood, and its practical advantages fully appreciated, reference will now be had to the accompanying sheets of drawings in which is depicted an embodiment thereof; however, it is to be understood that changes in the details and other forms thereof are within the scope of the claim, without departing from the fundamentals of said invention. In the drawings:

Fig. I is a diagrammatic view showing a hydraulic system embodying this invention with two typical control mechanisms and associated hydraulic motors as operable under the principles of this invention.

Fig. II is a sectional view, taken approximately on line II—II in Fig. I.

Fig. III is a sectional view, taken approximately on line III—III of Fig. I; and, Fig. IV is a velocity diagram used in describing the operation of this invention.

In Fig. I, the reference character 1 indicates a hydraulic pump and 2 an accumulator for supplying working liquid to the entire machine, not shown, while 3 represents a reservoir containing the working liquid. The pump 1 and accumulator 2 may be of any suitable type arranged to supply the entire machine with an ample supply of the working liquid at the desired constant working pressure. The pump 1 draws liquid from the reservoir 3 through a pipe 4 and discharges it to the accumulator 2 through a pipe 5. From the accumulator 2 hydraulic pressure is transmitted through the pipes 6, 7, 8 to the variable pressure reducing valve 9; through the pipes 6, 7 and 10 to the pressure varying mechanism 11; and through the pipes 6 and 12 to the flow control regulating valve 13.

The function of the variable pressure reducing valve 9 is to maintain, for any given setting of the pressure varying mechanism 11, a constant control pressure in the main pipe line 14 regardless of the velocity of flow of liquid that may take place through the same.

The function of the pressure varying mechanism 11 is to vary the magnitude of the control pressure in pipe line 14 to thereby simultaneously vary the rates of flow produced by the various control valves. This mechanism consists essentially of the body 15, the shaft 16, to which a disc 17 is attached, and an intermediate section 18. The body 15, intermediate section 18 and the body 19 of the variable pressure reducing valve 9 are all bolted together by means of three stud bolts 20, see also Fig. III. These parts being held in spaced relationship with respect to each other by means of six spacers 21, 22. The spacers 22 are a trifle longer than the thickness of disc 17, so that it may have a slight running clearance between the body 15 and intermediate section 18 to either side of same, for a purpose hereinafter referred to; while said disc serves as a regulator member. The working pressure is transmitted from the accumulator 2 to a passage 23 by means of the pipes 6 and 10. From this passage 23 the pressure is transmitted to an annular groove 24 in the shaft 16 and from thence through the passage 25, an axial passage 26, into angular passages 27 which lead to spaces 28 to the right-hand end of two small plungers 29 which are slidably fitted within corresponding bores through the intermediate section 18. The force thus transmitted to the plungers 29 is exerted on a disc 30 mounted on the right-hand end of a valve spindle 31 in the variable pressure reducing valve 9, and thereby exerts a force on said spindle proportional to the combined areas of plungers 29. The plungers 29 are identical and are placed diametrically opposite to each other with respect to the valve spindle 31 and at the same radial distance therefrom, so as to exert a balanced force on said spindle free from any tendency to bind the same within its housing 19. The regulator member 17 is fixed to the shaft 16 by a key 32, Fig. III. A lever 33 is secured to the outer end of the shaft 16, by means of a nut 34 and is also keyed to said shaft by means of a key 35. Within a suitable recess at the outer end of the lever 33 a shouldered lock pin 36 is slidably fitted. The end 37 of the lock pin 36, which is of reduced diameter is adapted to fit in any one of the three holes 38, 39 or 40, see also in Fig. II, formed in the machine housing 41. A spring 42 engages an inner shoulder of the lock pin 36 and normally holds the outer shoulder 43 of same against the face 44 of the housing 41 with the end 37 of said lock pin in one of the holes 38, 39 or 40. To change from one position to another, the knob 45' is provided which enables the operator to withdraw pin 36 and swing lever 33 to the position desired, whereupon release of said knob will allow the reduced end 37 to enter another of the holes 38—40 and lock the lever 33 in the deired new position. Three positions for the lever 33 are provided, corresponding to the locking holes 38, 39 and 40. In each position a different pair of plungers 45, 46 are brought into communication with the angular passages 27 of the regulator member 17 to exert a different force on the valve spindle 31 of the valve 9. When lock pin 36 engages the locking hole 38 the two angular passages 27 of valve disc 17 are brought into communication with the two plungers 45, Fig. III, of relatively small diameter; when lock pin 36 engages locking hole 39, the two angular passages 27 of the valve disc 17 are brought into communication with the two plungers 29, already described, which are of a larger diameter; and when the lock pin 36 is brought into engagement with lock hole 40 the two passages 27 of the valve disc 17 are brought into communication with the two plungers 46 of a still larger diameter. These three positions of the lever 33 corresponding to the locking holes 38, 39 and 40 give, with the constant working pressure as supplied by the accumulator 2, three corresponding constant values of the control pressure in the pipe line 14 through action of the valve 9 as will be described later, which are increased progressively in going from the hole 38 to the hole 40. It may be here noted that when the regulator member 17 is moved from a position registering with the set of plungers 29 towards a position registering with the set of plungers 46, for example, of larger area the valve means 30—31 will move to the left, whereby a vacuum will tend to be created in the spaces 28, occupied by the plungers not in register with the angular passages 27, which will not interfere with the free movement of said member 17. On the other hand, when the regulator member 17 is moved towards a position where the angular passages 27 register with the set of plungers 45, for example, of smaller area the valve means 30—31 will move to the right whereby the pressure fluid trapped in the non-registering plunger spaces 28 is displaced by way of the slight working clearance afforded the regulator member between the confronting ends of the body 15 and intermediate section 18, as hereinbefore stated, in addition to seeping outwards past the plungers 29 toward the disc 30 and escape, with resultant relief of any movement restraining pressure it might otherwise have if not so evacuated. This will give to the several motors of a hydraulically operated machine, equipped with, and under the control of this invention three different ranges in the rates of velocity of movement as governed by the individual control valve mechanism for each motor, i. e., if we let $x$, $y$ and $z$ (Fig. II) represent the positions of lever 33 when lock pin 36 engages the holes 38, 39 and 40, respectively, then with lever 33 in position $x$ and with a given setting of the individual control valve 47 for a given motor 48, Fig. I, for example, a certain velocity of movement will be imparted to the movable member 49 of said motor which may be designated as $Vx$, Fig. IV. If the setting of the flow control valve 47 by its needle member 50 remains unchanged and lever 33 is now shifted to position $y$, a higher velocity will be imparted to the movable member 49, which we may call $Vy$; and if lever 33 is swung to position $z$, with the same setting of valve 47, a third and still higher velocity of movement $Vz$ will be imparted to the movable member 49 of the motor 48. If the flow control valve 47 is now given a new setting, opened wider for example, then with the three positions of the lever 33 there will be obtained three more progressively increasing velocities which may be designated as $Vx'$, $Vy'$ and $Vz'$. If this process is repeated with a still wider opening of the valve 47, there will be ensured still three more progressively increasing velocities which may be designated as $Vx''$, $Vy''$ and $Vz''$. If now the first value of the area of opening of the flow control valve 47 were the minimum opening of its operating range of openings, the third were its maximum, and the second a value half-way between the two, and the corresponding velocities of movement of the movable member 49 are plotted to scale with the values of these velocities of said movable member as ordinates and the values of the area of opening of valve 50 as abscissas, then the curves shown in Fig. IV will be obtained. These curves from a properly designed machine should be substantially straight lines. Curves $Vx$, $Vx'$, $Vx''$ would represent to scale the available velocities from minimum to maximum that could be imparted to the movable member 49 by the various openings of the flow control valve 47 with lever 33 in position $x$, Fig. II, and the range of velocities $Vx$ to $Vx''$ would then be the range available with lever 33 in said position. Likewise $Vy$ to $Vy''$ and $Vz$ to $Vz''$ would be the ranges available with the lever 33 in the positions $y$ and $z$, respectively, of Fig. II. Such an arrangement, with three progressively increasing ranges, as described, would be most suitable for use in the control of the feeds of a machine tool. The $y$ position could be used for the average class of work; the $z$ position would be used on work of soft material such as brass, soft bronze, aluminum, etc., which would permit of unusually high cutting speeds and consequently higher velocities of feed; while the $x$ position could be used on work of hard or tough material such as tool steel, stainless steel, etc. which would require unusually low cutting speeds and correspondingly lower velocities of feed.

The valve 9 is a simple form of pressure reducing valve, and receives working liquid at constant pressure from the accumulator 2 through the pipes 6, 7 and 8. It maintains in the pipe line 14, which leads therefrom, a constant control pressure at all the feed control valves, such as 47, of the entire machine of such magnitude as is determined by the position of the lever 33, as hereinbefore described. The action of the valve 9 in maintaining a predetermined constant control pressure in the pipe line 14 may be briefly described as follows. The pressure existing in the space 51 to the left-hand of valve 31 is approximately equal to the constant pressure of the accumulator 2 less the minor loss effected by passage through the restrictions 54, 53, 55, and disregarding pipe line losses from same to angular passages 27, multiplied by the sum of the areas of any given pair of plungers, such as 29, that said passages may be in communication with, divided by the area of the valve 31. This pressure maintains the correct opening between an annular groove 52 of the valve 31 and a port 53 in the valve body 19, so that the pressure of the liquid flowing from the pipe 8 through a passage 54 past said port of valve 31 through passages 55 and 56 into the pipe line 14 is reduced to just this same pressure regardless of the quantity of liquid flowing through. If the quantity of liquid drawn through the pipe line 14 by the various feed control valves, such as 47, to which it connects, should be reduced, in the operation of the machine, then the pressure in the space 51 to the left-hand of valve 31 will increase a slight amount temporarily to move said valve to the right-hand and close the opening of same sufficiently to maintain the reduced quantity of flow through the pipe line 14 at the same control pressure as before. Conversely, if the amount of liquid drawn through the pipe line 14 by the various feed control valves should increase, the pressure in the space 51 to the left-hand of valve 31 would decrease a slight amount temporarily to allow said valve to move to the left-hand to increase the opening of same sufficiently to maintain the greater quantity of flow through the pipe line 14 at the same control pressure as before. Passages 57 and pipe 58, which lead to the reservoir 3, are provided for the purpose of relieving the pressure in the space 51 to the left-hand of the valve 31 in case no liquid were drawn from the pipe line 14 and said valve should tend to move to the right-hand beyond the point of closing of same, due to leakage or other causes. Uncovering of the passage 57 to the annular groove 52 in the valve 31 would allow escape of liquid to the reservoir 3 and prevent further movement of said valve to the right-hand, and also prevent control pressure in the pipe line 14 from being increased. An annular groove 59 is provided in the shaft 16 for the purpose of collecting any leakage of liquid that may occur to the right-hand of the annular groove 24 and lead it through a passage 60 and pipe 61 to the reservoir 3 and thereby prevent such leakage of liquid from following the shaft 16 to the outside of the machine.

In Fig. I, 48 and 62 represent motors, shown as hydraulic cylinders in this instance; and they are each connected to a different form of control valve mechanism. The two different forms of control valve mechanisms shown are typical of most of the valve mechanisms in common use in hydraulically operated machines embodying the "open circuit" principle of operation and a description of the action of this invention in connection with these two typical forms of control valve mechanism should suffice for most applications of the same.

In Fig. I, the system embodying the simple needle control valve 47 and its motor 48 is a very common one and is one of the simplest forms of flow control means used in an open circuit. It is sometimes used for controlling the motions of a tool slide and holds a fairly uniform velocity of movement of same with a constant pressure in a pipe 63 at the "upstream" side of the valve 47 if the variation of the cutting resistance is not great. When this system is used as a timing device in which practically no resistance to motion is encountered by the movable member 49, a substantially uniform velocity may be obtained with a constant pressure in the line at the "upstream" side of valve 47. In this system, flow takes place from the pipe line 14 through the connecting pipes 63, 64 and associated passages 65, 66, inclusive, which lead through the control valve 47 into the intake 67 of the motor 48. Liquid is expelled through the discharge 68 and pipe 69 to the reservoir 3. It is obvious that the rate of flow of liquid through the control valve 47 of such a simple system, and the resulting velocity of movement of the movable member 49 would be a direct function of the pressure in the pipe line 14, and that the velocities of motion produced by the motor 48 at the various openings of valve 47 and positions of the lever 33 would be substantially of the character as represented by the curves of Fig. IV.

In Fig. I, the control valve mechanism for control of the motor 62 includes, in addition to the flow control valve 70 having a needle adjustment 71, the flow regulating valve 13, the purpose of which is to maintain a constant velocity of motion of the movable member 72, regardless of the resistance to motion of same in the operation of the machine of which this system forms a part. The principles underlying the operation of this type of valve 13 are in common use and are generally understood by those skilled in the art. The specific construction and method of use of the valve shown herein are described in another application, Serial No. 59,638, filed January 17, 1936. This valve 13 consists essentially of the valve spindle 73 and the piston 74 formed integrally therewith, both being slidably fitted within the bore of the valve body 75. The spaces 76, and 77, to the right and left-hand, respectively, of the piston 74 are connected to points in the "upstream" and "downstream" connections, respectively, of the control valve 70. Space 76 connects, by means of a passage 78 to the passage 79 at the "upstream" side of valve 70 while space 77 connects, by means of a passage 80, pipe 81, and pipe 82 to the "downstream" side of the valve 70. In the normal operation of the mechanism included in this system a flow of the working liquid takes place from the accumulator 2 through the pipes 6 and 12, passage 83, groove 84 in the valve spindle 73, annular port 85 in valve body 75, passage 79, pipe 86 and passage 87, through the restricted opening of valve 70, passage 88, pipe 82, and branch 89 into the intake opening 90 of the motor 62 to impart motion to its movable member 72. Liquid escapes through the discharge outlet 91 of motor 62 and pipe 92 to the reservoir 3. This flow of the working liquid through the control valve 70 creates a pressure differential between the "upstream" and "downstream" connections or the passages 87, 88 of the valve 70. This pressure differential transmitted to the spaces 76 and 77 at the right and left-hand sides, respectively, of the movable member or piston 74 gives a net force tending to move valve spindle 73 to the left, which is resisted by a small piston 93 in a cylinder 94 to the left-hand of valve body 75. Piston 93 is urged to the right-hand to resist the leftward force of the valve 13, by the control pressure in the pipe line 14 which is transmitted to the space 94 to the left-hand of the piston 93, by means of a branch pipe 95 and passage 96. The pressure differential set up between the "upstream" and "downstream" passages 87, 88 of the valve 70 is just such an amount as will balance the force of the piston 93 which is proportional to the control pressure in the pipe line 14. That this condition is maintained regardless of the resistance to motion met with by the movable member or piston 72 may be more readily understood if a description of the regulating action of the piston 74 of the valve 13 in maintaining a constant rate of flow under a variation in the resistance to motion of the movable member or piston 72 is given. With motion of the movable member or piston 72 at a given velocity against a given operating resistance and valve 74 in a given position of equilibrium, if the resistance to motion is increased the velocity of piston 72 will temporarily decrease slightly, causing thereby a reduced rate of flow past the control valve 70. The reduced rate of flow past the valve 70 will result in an increase in the "downstream" pressure of valve 70 to help overcome the greater resistance to motion met with by the movable member or piston 72 and, at the same time, will cause piston 74 and its valve stem 73 to move slightly to the right-hand to increase the opening of the valve 13. This increased opening or movement of the valve stem 73 will increase the pressure differential at valve 70 and consequently still further increase the "downstream" pressure of said valve 70. This action will continue until the "downstream" pressure of valve 70 or the pressure at the intake 90 to motor 62 is sufficiently increased to overcome the greater resistance to motion encountered by its movable member or piston 72, and until the pressure differential at the sides of the piston 74 is restored to its former value. If the resistance to motion of the movable member or piston 72 should decrease, an action of the valve stem 73 and piston 74 opposite to that described would take place to reduce the pressure at the intake 90 to motor 62 to correspond to the lowered resistance to motion of its movable member 72 and yet maintain the same pressure differential between the "upstream" and "downstream" sides of the valve 47 as before.

It is thus apparent that with a flow regulating valve 13 such as described, the pressure differential at its companion flow control valve, 70 in this case, will be held constant regardless of the operating resistance to motion encountered. A constant pressure differential between any given point at the "upstream" side of the valve 70 and any other point at the "downstream" side of same can, with a fixed opening of the latter, be the result only of a constant velocity of flow past said control valve 70 at a given temperature of the working liquid; and the magnitude of the velocity of flow is a function of this pressure differential, disregarding pressure losses due to pipe friction. These losses may be made negligibly small by using connecting pipes of sufficiently large diameter. Inasmuch as the pressure differential of the valve 70 is proportional to the control pressure of the pipe line 14, the velocity of flow through the valve 70 and consequently the velocity of movable member or piston 72 is therefore a function of this control pressure of pipe line 14 which is the same regardless of the operating resistance encountered by the movable member or piston 72. From this it follows that the velocities of motion produced by the motor 62 at the various openings of the valve 70 and positions of the lever 33 would be substantially of the character as represented by the curves of Fig. IV regardless of variations in the resistance to motion encountered and will therefore be of the same character as those produced by the motor 48 under control of the valve 47, or any other motors of the same machine under control of the same or similar types of control valves as those illustrated in Fig. I, all being connected to the pipe line 14 and under the same control pressure from the valve 9.

97 is a fall-down cover suitably hinged at 98 to supporting lugs 99 projecting from the machine housing 41, and it serves to close in the control lever 33, and associated parts, against illicit manipulation or being otherwise tampered with.

From the foregoing disclosure, it will be readily seen that, by this invention, there is provided a device that positively fulfills the objects set forth in the prefatory paragraphs of this specification; and while a preferred means to accomplish such objects has been described in detail, still in practice deviations from the explained form may be resorted to without departure from the spirit and scope of said invention as more concisely defined by the following claim.

Having thus described my invention, I claim:

Means for increasing the range of flow rates produced by the control valves of hydraulically actuated machines, operating on the open circuit principle, comprising axially aligned end sections and an intermediate body section, means securing said sections in spaced relation, the first end section having an open-ended bore therein and the second end section having a closed-end bore therein, a rotatable control-shaft within the open-ended bore and having an annular groove and communicating axial passage therein, a source of working pressure connecting with said groove by way of a port in said section; a disc between the first end section and the intermediate body section and having a pair of angular ports communicating with the control-shaft axial passage and opening to the confronting face of the intermediate section and having provision of a pressure relief clearance; the second end section having an inlet port communicating with the source of pressure, an outlet port communicating with a flow control valve of the machine to be actuated, an angular passage opening into the bore at its closed end and at another portion thereof and connected with said outlet, an annular groove in said bore intermediate the openings of said angular passage and communicating with said inlet, a valve member axially shiftable in said bore, said member having the outer end and an intermediate portion diametrically reduced to provide an enlarged head therebetween, the intermediate reduced portion affording flow communication between the annular groove and said angular passage, and the enlarged head variably throttling the working pressure through said end body section to said flow control valve of the machine to be actuated; diametrically-related pairs of bores of differential areas through the intermediate body section, a flange member at the inner end of the valve member with circumferentially-spaced plungers, said plungers being operative in the bores of said intermediate section in one direction by the working pressure through the angular ports of said disc and in the reverse direction by the pressure in the closed end of the bore in said second end section acting on said enlarged head of the valve; and means for imparting definite rotary movements to the control-shaft for effecting registration of the outer ends of the angular ports in the control-shaft disc with the open ends of the respective pairs of the plunger containing bores in the intermediate body section, to thereby vary the resulting pressure on the valve member in its various settings because of the different areas of the respective pairs of the plungers.

GILBERT V. ANDERSON.